No. 12,769. REISSUED MAR. 24, 1908.
I. E. PALMER.
THREAD GUIDE.
APPLICATION FILED DEC. 31, 1907.
Fig. 1
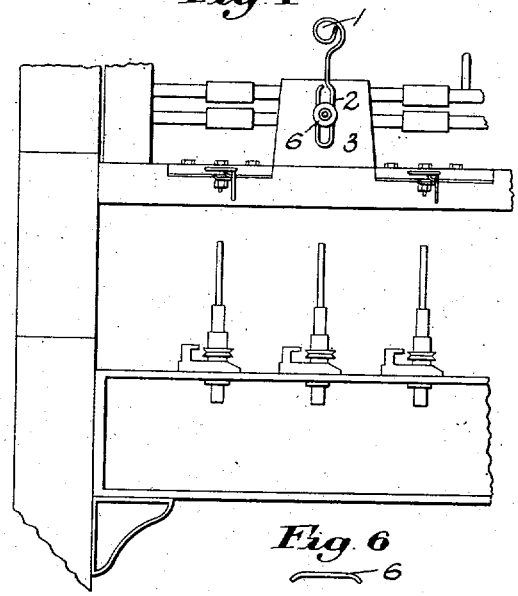
Fig. 2
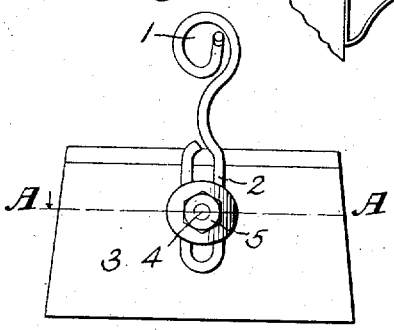
Fig. 6
Fig. 5
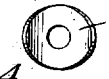
Fig. 4
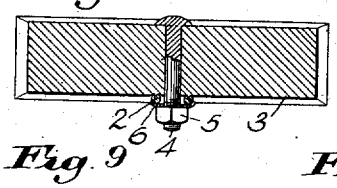
Fig. 3
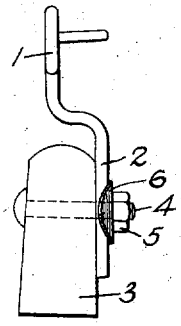
Fig. 7
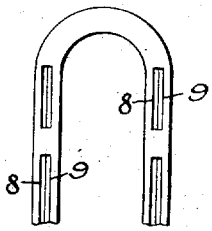
Fig. 9
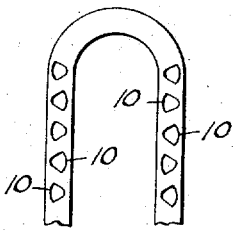
Fig. 11
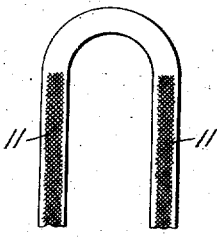
Fig. 8
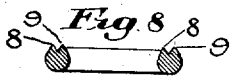
Fig. 10
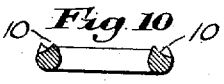
Fig. 12
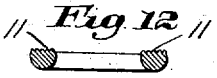
Witnesses:
Horace A. Crossman
Robert H. Kammler.
Fig. 13
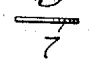
Inventor:
Isaac E. Palmer
by Emery and Booth Attys.
THE NORRIS PETERS CO., WASHINGTON, D. C.

UNITED STATES PATENT OFFICE.

ISAAC E. PALMER, OF MIDDLETOWN, CONNECTICUT.

THREAD-GUIDE.

No. 12,769. Specification of Reissued Letters Patent. Reissued Mar. 24, 1908.

Original No. 855,803, dated June 4, 1907, Serial No. 349,240. Application for reissue filed December 31, 1907. Serial No. 409,014.

*To all whom it may concern:*

Be it known that I, ISAAC E. PALMER, a citizen of the United States, and a resident of Middletown, in the county of Middlesex and State of Connecticut, have invented a new and useful Improvement in Thread-Guides, of which the following is a specification.

My invention relates to thread guides and more particularly to thread guides for use in connection with spinning or twisting machines, the object being to provide a simple and inexpensive guide which may be adjusted universally in a horizontal plane to bring its eye in exact alinement with the axis of the spindle in connection with which it is intended to coöperate.

In the accompanying drawings, Figure 1 represents several thread guides attached to the under sides of a finger board, one of the sections of the finger board being turned into upright position; Fig. 2 is a bottom plan view of one of the finger board sections with guide thereon showing the same on an enlarged scale; Fig. 3 is a view of the same in edge elevation; Fig. 4 is a transverse section in the plane of the line A—A of Fig. 2; Fig. 5 is a plan view in detail of one of the retaining washers; Fig. 6 is an edge view of the same; Fig. 7 is an enlarged partial view in detail of one of the loops; Fig. 8 is a transverse section of the same; Fig. 9 is a partial plan view of a modified form of loop; Fig. 10 is a transverse section of the same; Fig. 11 is a partial plan view of another modified form of loop; Fig. 12 is a transverse section of the same; and Fig. 13 is an edge view of a modified form of washer.

My present invention consists in providing the thread guide with a shank adapted to interlock with the finger board section producing a frictional grip which will do away with the necessity of a washer or bearing plate interposed between the shank and the finger board section.

Where the finger board section is wood, the shank may be provided with projections capable of piercing the surface of the finger board section sufficient to hold the guide in such position as it may be placed either in a lateral or longitudinal adjustment. The interlocking or frictional grip may be secured by reason of the hereinafter described formation of the washer or clamp, and without the employment of piercing projections.

The thread guide contemplated in my present invention consists of wire bent to form an eye 1 through which the thread passes and a shank 2 of loop form made by bending back the wire along itself. This loop portion of the shank is intended to rest flat on the face of the finger board section 3 and is clamped in position by means of a bolt 4 provided with a nut 5.

The bolt 4 preferably passes through the finger board section 3 and between the parts of the loop 2 of the shank of the guide and there is preferably interposed between the nut 5 and the loop 2, a retaining washer 6 so shaped as to prevent the parts of the loop 2 from spreading and, at the same time, forming a seat for the nut 5 to enable it to press with equal force upon both parts of the loop 2. The washer or clamp, by reason of the fact that it embraces the loop 2 and thereby prevents relative rotation of the clamping member and thread guide and the lateral spreading of the members of the thread guide, may without injury to the loop receive greater pressure from the nut 5 and transmit the same to the loop with the result that the latter will engage its support with a frictional grip sufficient to constitute an interlocking engagement. Moreover, the washer or clamp acts as a guard to exclude the thread from the adjacent parts. In the event, however, the wire which forms the guide is sufficiently heavy so that there is no liability of the parts of the loop to spring away from each other, a flat washer such as shown at 7, Fig. 13, may be employed instead of the curved or flanged washer 6, and it is obvious that the nut 5 might be of sufficient breadth to bear directly on the parts of the loop 2 instead of the flat washer 7.

To reinforce the previously described action and to insure the holding of the guide against any liability of tilting laterally or moving longitudinally on the face of the finger board section 3, the side of the loop 2, toward the face of the finger board section may be provided with spurs 8 and 9 of elongated form such as shown on an enlarged scale in Figs. 7 and 8, or of shorter form such as shown at 10, Figs. 9 and 10, or the surface may be hatched as shown at 11, Figs. 11 and 12.

The spurs may be conveniently formed by turning up the metal of the loop into a sharp ridge or projection by means of stamping or by means of a metal grooving or gouging tool in such form that the projecting metal will have a sharp edge or point which will indent, to a slight degree, the surface of the finger board.

If the guide were to be used with a metallic finger board section, it would be desirable to hatch the surface of the finger board section similar to the surface shown on the guide, Figs. 11 and 12, in order to have the projections on the guide interlock with those on the finger board.

When the shank of the guide is provided with these projecting points or edges, it will grip the surface of the finger board section with sufficient firmness to prevent accidental displacement whether the shank wire be round in section, as shown in Figs. 8 and 10, or whether it be flattened as shown in Fig. 12.

In operation, the guide may be readily adjusted to bring its eye in axial alinement with the axis of the spindle by loosening the nut and adjusting the guide on the face of the finger board section to exactly the right position and then screwing up on the nut with sufficient pressure to interlock the projections on the guide with the face of the finger board section, or to obtain an interlocking action by the tight frictional grip that may be secured by the employment of a washer or clamp embracing the loop.

In using the word "interlocking" to express the engagement of the shank of the guide with the finger board head, it is intended to express an actual interlocking of the shank with the surface either by piercing the surface or by indenting it to such a degree as to positively prevent the lateral displacement of the shank with respect to the surface with which it is interlocked until the interlocking pressure of the fastening device is removed.

What I claim is:—

1. The combination with a finger board, of a thread guide having its shank provided with means for interlocking the shank with the finger board.

2. The combination with a wooden finger board, of a thread guide having its shank provided with projections for piercing the surface of the finger board and means for fastening the guide to the finger board.

3. The combination with a wooden finger board of a thread guide having its shank turned back along itself, said shank having means on its inner face for interlocking it with the finger board and means for fastening the guide to the finger board.

4. The combination with a wooden finger board, of a thread guide having its shank turned back along itself to form a loop, said loop portion of the shank having means on its inner face for interlocking it with the finger board and means for fastening the guide to the finger board.

5. The combination with a wooden finger board, of a thread guide having its shank turned back along itself to form a loop, said shank having means on its face for interlocking with the finger board, a washer arranged to partially embrace the shank to prevent the loop from spreading and a fastening device for holding the parts in assembled adjustment.

6. The combination with a finger board, of a thread guide having a slotted shank, a clamping member shaped to embrace the slotted shank, and fastening means passing through the clamping member and the slotted portion of the shank and engaging the finger board, to hold the parts in assembled position.

7. The combination with a finger board, of a thread guide having a slotted shank, a clamping member having opposite deflected edges embracing the members of the shank to prevent them from spreading, and fastening means for holding the parts in assembled position, the construction of the parts permitting the engagement of the thread guide with its support with sufficient frictional grip to prevent lateral displacement of the guide.

8. The combination with a finger board, of a thread guide having a slotted shank contacting with the finger board, a clamping member having opposite deflected edges embracing the members of the shank to prevent them from spreading and to exclude the thread, and fastening means for holding the parts in assembled position, the construction of the parts permitting the engagement of the thread guide with its support, with sufficient frictional grip to prevent lateral displacement of the guide.

9. The combination with a finger board of a thread guide rotatably adjustable thereon and having a shank, a clamping member therefor, said shank and clamping member presenting an interlocking formation to prevent relative rotation, but permitting longitudinal adjustment, and fastening means engaging said clamping member and finger board and binding the said shank against movement from adjusted position.

In testimony whereof, I affix my signature in the presence of two witnesses.

ISAAC E. PALMER.

Witnesses:
F. E. FOWLER,
CHAS. M. SAUER.